United States Patent
Holden et al.

(10) Patent No.: US 9,063,996 B2
(45) Date of Patent: Jun. 23, 2015

(54) MINIMIZING REPLICATION SEARCH ON FAILOVER

(71) Applicant: International Business Machines Corporation, Armonk, NY (US)

(72) Inventors: Russell Holden, Littleton, MA (US); William A. Spencer, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/010,147

(22) Filed: Aug. 26, 2013

(65) Prior Publication Data

US 2014/0059006 A1  Feb. 27, 2014

Related U.S. Application Data

(63) Continuation of application No. 13/172,797, filed on Jun. 29, 2011, now Pat. No. 8,543,545.

(51) Int. Cl.
*G06F 17/30* (2006.01)

(52) U.S. Cl.
CPC .... *G06F 17/30575* (2013.01); *G06F 17/30578* (2013.01)

(58) Field of Classification Search
None
See application file for complete search history.

(56) References Cited

U.S. PATENT DOCUMENTS

| | | |
|---|---|---|
| 6,523,036 B1 | 2/2003 | Hickman et al. |
| 6,701,453 B2 | 3/2004 | Chrabaszcz |
| 6,973,463 B2 | 12/2005 | Merrells et al. |
| 7,624,169 B2 | 11/2009 | Lisiecki et al. |
| 7,694,086 B1 | 4/2010 | Bezbaruah et al. |
| 7,765,186 B1 | 7/2010 | Hu et al. |
| 7,814,499 B2 | 10/2010 | Straube et al. |
| 7,840,353 B2 | 11/2010 | Ouksel et al. |
| 7,840,535 B2 | 11/2010 | Barboi et al. |
| 7,853,561 B2 | 12/2010 | Holenstein et al. |
| 7,917,513 B2 | 3/2011 | Watanabe et al. |
| 7,921,268 B2 | 4/2011 | Jakob |
| 8,041,674 B2 | 10/2011 | Yatabe et al. |
| 8,195,777 B2 | 6/2012 | Hanai et al. |
| 2004/0230619 A1 | 11/2004 | Blanco et al. |
| 2007/0150526 A1 | 6/2007 | D'Souza et al. |

(Continued)

OTHER PUBLICATIONS

Non-Final Office Action for U.S. Appl. No. 13/172,797, mailed Sep. 24, 2012, 19 pages, U.S. Patent and Trademark Office.

(Continued)

*Primary Examiner* — Debbie Le
(74) *Attorney, Agent, or Firm* — Jordan IP Law, LLC (57) ABSTRACT

A method, system, and program product are provided for minimizing replication when a new server is replicated with. A replication application for a client computer having a replica of a database thereon is executed by a processor in a computer to receive for a replication service comprising a plurality of servers containing replicas of the database, an indication of each healthy server in the replication service and a determined period of time within which replication is assured to have been completed for each healthy server. The replication application updates a replication history after successful completion of each replication by adding an entry comprising an identification for the server replicated with and a timestamp for the time of replication and by adding an entry for each other healthy server in the replication service containing an identification for the respective server and an imputed timestamp adjusted for the determined period of time.

18 Claims, 4 Drawing Sheets

(56) References Cited

U.S. PATENT DOCUMENTS

| | | |
|---|---|---|
| 2007/0185920 A1 | 8/2007 | Castro et al. |
| 2009/0157766 A1 | 6/2009 | Shen et al. |
| 2009/0172142 A1 | 7/2009 | Hanai et al. |
| 2011/0219108 A1 | 9/2011 | Lisiecki et al. |
| 2011/0258488 A1* | 10/2011 | Nightingale et al. ........... 714/15 |

OTHER PUBLICATIONS

Notice of Allowance for U.S. Appl. No. 13/172,797, mailed May 16, 2013, 15 pages, U.S. Patent and Trademark Office.

* cited by examiner

MINIMIZING REPLICATION SEARCH ON FAILOVER

CROSS-REFERENCE TO RELATED APPLICATIONS

The present application is a continuation of U.S. patent application Ser. No. 13/172,797 filed on Jun. 29, 2011.

FIELD OF THE INVENTION

The invention relates to the field of computer systems and more particularly to a method, system, and program product for minimizing replication on failover or site flip.

BACKGROUND

In computer networks, databases are often replicated on multiple computers to provide better access to them. A user may have a local replica of a database (e.g. mail file). The local replica of a mail file, for example, regularly replicates with a server computer to pull in new messages, and to send updates to the server as the user processes their messages (e.g. deletes messages, files messages in various folders, sends new messages, etc). Following replication, typically a replication history is updated so that a replication application can determine where to pick up on the next replication. The replication history may be stored at the client computer, the server, or on both. Similarly, A replication application to perform the replication actions may be stored at the client computer, the server, or on both.

Typically, the replication history will contain the other computer's identity, as well as a time stamp representing the time of the last successful replication between the client computer and the other (server) computer. When a new replication is triggered between the client computer and the other computer, the replication application replicates changes from the time of the timestamp in the replication history. However, if a new server with a new server replica is added, or if replication fails over to a server replica that the client (or local) replica has not previously replicated with, then the client (or local) replica and the new server replica must perform a full (from time 0) replication. This full replication can be very time consuming and can be a CPU, network, and I/O intensive operation. Similarly, if replication fails over to a server that the local replica has not replicated with recently, a potentially long replication may result. Note that, even if the new server is completely up to date (through replication with the other server), it must engage in long replication to determine if the local and server replicas are in sync.

This problem is especially pronounced in cloud computing when a disaster recovery site is involved. In this scenario, the local replica replicates with the primary (active) site. Months may elapse with the local replica and the primary site replicating regularly. Then, one day, because of an actual disaster, or because of a planned site flip, the user's computer may be connected to the former disaster recovery site. Since the local replica has never replicated with the disaster recovery site, or in the case of a planned site flip, may not have replicated with the disaster recovery site in several months, a lengthy replication will result. In a cloud system, thousands of local replicas may be involved in a site flip, placing a huge load on the local and cloud systems.

SUMMARY

A method, device, and program product are provided for minimizing replication when a different server is replicated with on failover or site flip.

According to one embodiment, a method is provided for minimizing replication when a new server is replicated with. A replication application for a client computer having a replica of a database thereon is executed by a processor in a computer to receive for a replication service comprising a plurality of servers containing replicas of the database, an indication of each healthy server in the replication service and a determined period of time within which replication is assured to have been completed for each healthy server. The replication application updates a replication history after successful completion of each replication by adding an entry comprising an identification for the server replicated with and a timestamp for the time of replication and by adding an entry for each other healthy server in the replication service containing an identification for the respective server and an imputed timestamp adjusted for the determined period of time.

According to one embodiment each replication history entry has a timestamp for sent to server time and a time stamp for received from server time.

According to one embodiment the imputed time stamp is calculated by subtracting the determined period of time from the time of replication.

According to one embodiment the indication of each healthy server in the replication service and the determined period of time are published by the replication service.

According to one embodiment the indication of each healthy server only indicates servers that have been continuously on line for longer than the determined period of time.

According to one embodiment, the replication application is stored on a memory in the client computer and executed by a processor in the client computer.

According to one embodiment the replication application is stored on a memory in at least one of the plurality of servers and executed by a processor in the at least one of the plurality of servers.

According to one embodiment of the present invention a computer-based method is provided for minimizing replication when a new server is replicated with. A replication service comprising a plurality of servers containing replicas of a database, identifies each healthy server in the service and determines a period of time within which replication is assured to have been completed for each healthy server in the replication service. The replication service provides the identification of each healthy server and the determined period of time to a client computer having a replica of the database thereon, and the client computer updates a replication history after successful completion of each replication with a server of the replication service by adding an entry comprising an identification for the server replicated with and a timestamp for the time of replication and by adding an entry for each other healthy server in the replication service containing an identification for the respective server and a timestamp adjusted for the determined period of time.

According to one embodiment of the present application a computer system is provided for minimizing replication when a new server is replicated with. The computer system comprises: a replication service comprising at least two servers; at least one processor in each of the at least two servers; at least one memory in each of the at least two servers operably connected to the at least one processor in the respective server and having encoded thereon a replica of a database; and a program of instruction encoded on the at least one memory of each of the at least two servers and executable by the at least one processor of each of at least two servers. The program of instruction comprises: program instructions to identify each healthy server in the replication service and determine a period of time within which replication is assured to have been completed for each healthy server in the replication service; and program instructions to provide the identification of each healthy server and the determined period of time to a replication application.

According to one embodiment the program of instruction is stored on a client computer having a replica of the database thereon.

According to one embodiment the program of instruction is stored on the at least two servers of the replication service.

According to one embodiment. the computer system further comprises: program instructions to update the replication history after successful completion of each replication by adding an entry comprising an identification for the server replicated with and a timestamp for the time of replication and by adding an entry for each other healthy server in the replication service containing an identification for the respective server and an imputed timestamp adjusted for the determined period of time.

According to one embodiment of the present invention, a computer system is provided for minimizing replication when a new server is replicated with. The computer system comprises: at least one client computer, having at least one processor, at least one memory operably connected to the at least one processor, a replication history stored on the at least one memory, and a program of instruction encoded on the at least one memory and executed by the at least one processor to minimize replication when a new server is replicated with. The program of instruction comprises: program instructions to receive from a replication service comprising a plurality of servers containing replicas of the database, an indication of each healthy server in the replication service and a determined period of time within which replication is assured to have been completed for each healthy server in the replication service; and program instructions to update the replication history after successful completion of each replication by adding an entry comprising an identification for the server replicated with and a timestamp for the time of replication and by adding an entry for each other healthy server in the replication service containing an identification for the respective server and an imputed timestamp adjusted for the determined period of time.

According to one embodiment of the present invention, a program product is provided for minimizing replication when a new server is replicated with. The program product comprises a tangible computer readable storage device having encoded thereon a computer executable program of instructions. The program of instruction comprises: program instructions to receive for a replication service comprising a plurality of servers containing replicas of a database, an indication of each healthy server in the replication service and a determined period of time within which replication is assured to have been completed for each healthy server in the replication service; and program instructions to update a replication history after successful completion of each replication by adding an entry comprising an identification for the server replicated with and a timestamp for the time of replication and by adding an entry for each other healthy server in the replication service containing an identification for the respective server and an imputed timestamp adjusted for the determined period of time.

BRIEF DESCRIPTION OF THE DRAWINGS

The features and advantages of the invention will be more clearly understood from the following detailed description of the preferred embodiments when read in connection with the accompanying drawing. Included in the drawing are the following figures.

DETAILED DESCRIPTION

Figure 1:
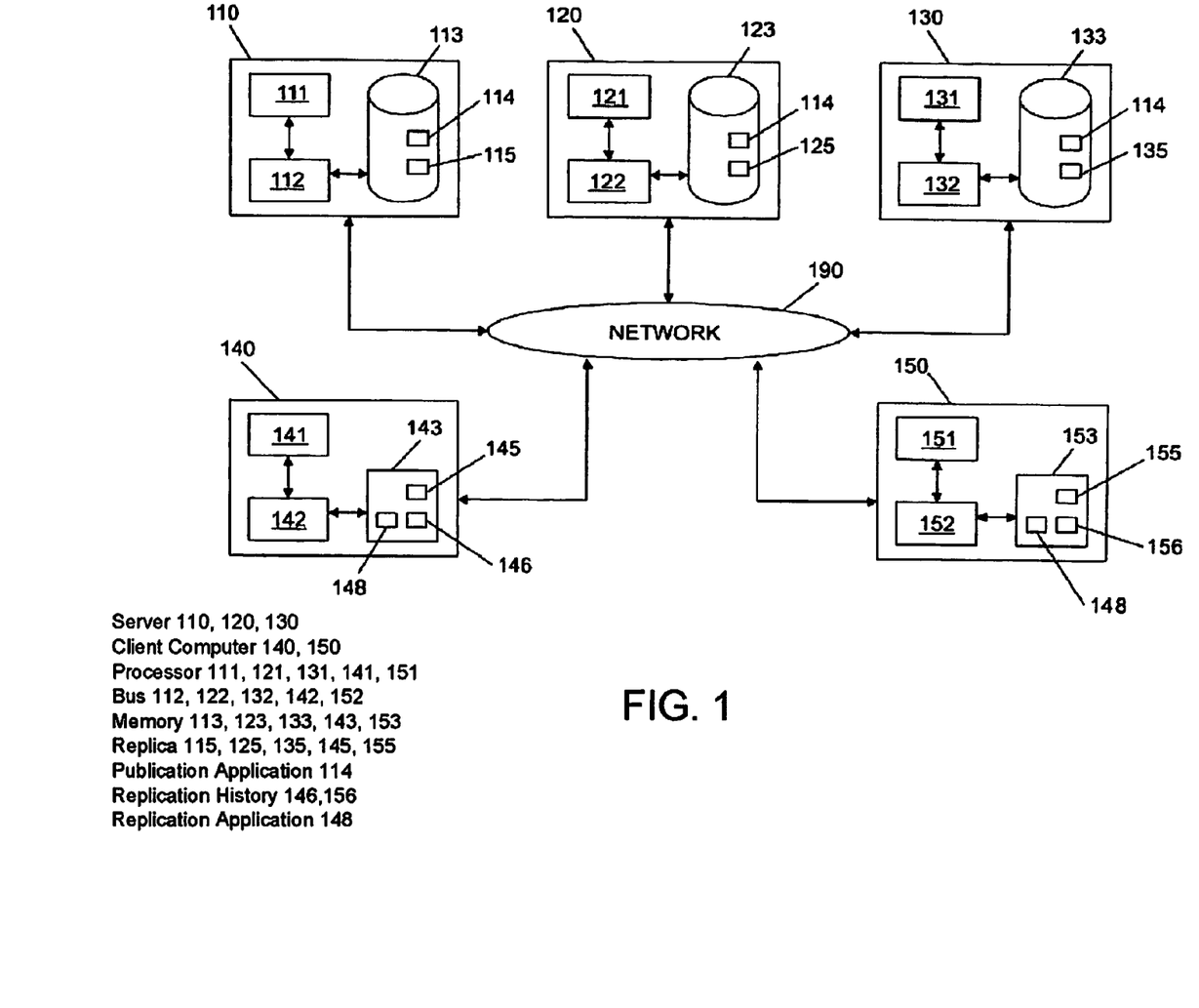
FIG. 1 is a block diagram of a computer system for minimizing replication when a different server is replicated with, according to an embodiment of the present invention.

The present invention provides a method, system, and program product for minimizing replication on failover or site flip. According to an embodiment of the present invention, a replication service comprises a plurality of servers 110, 120, 130, each server having a replica 115, 125, 135 of a database stored thereon.

The servers 110, 120, 130 of the replication service are connected to a client computer 140, 150 also having a replica 145, 155 of the database stored thereon. The client computer 140, 150 replicates with a server 110, 120, 130 from time to time to send and receive recent changes to the database.

When the client computer 140, 150 replicates with a server 110, 120, 130, the client computer 140, 150 updates a replication history 146, 156, saving the identity of the server 110, 120, 130 replicated with and a time stamp indicating the time when the replication was completed. Then, the next time that the client computer 140, 150 replicates with the same server 110, 120, 130, the replication procedure only has to implement changes that occurred in the database after the last replication.

According to one embodiment, when the client computer 140, 150 updates the replication history, in addition to saving an identity and time stamp for the server actually replicated with, the server 110, 120, 130 also provides, and the client computer receives, an identification of each healthy server in the replication service and a quality of service metric comprising a time period within which replication with each other server in the service is assured to have been completed. Then, the client computer imputes a time stamp for each healthy server in the replication service that is not replicated with comprising the time of completion of the replication modified by the quality of service metric. The client computer enters this imputed time stamp in the replication history.

Referring now to FIG. 1, a block diagram of computer system for minimizing replication on failover or site flip according to an embodiment of the present invention is shown. The computer system comprises a replication service having a plurality of servers 110, 120, 130, each having a replica 115, 125, 135 of a database. The replication service servers 110, 120, 130 are connected, through a network 190 to one or more client computers 140, 150 having a replica 145, 155 of the database. The servers 110, 120, 130 may be any type of server suitable for centralizing business processes, such as System x®, Power®, and Blade center® servers from IBM®. The client computer 140, 150 may be another server, a general purpose computer, a personal computing device (such as a PDA), or any other computing device capable of storing and updating a database replica. The network 190 may be a local area network (LAN), a wide area network (WAN), the Internet, or any other network suitable for connecting servers and clients.

Each server 110, 120, 130 has a processor 111, 121, 131, respectively. The processors 111, 121, 131 are operably connected with corresponding memory devices 113, 123, 133, respectively through a system bus 112, 122, 132, respectively or other means for transmitting electronic signals. The processors 111, 121, 131 may be any processing device or unit suitable for executing program code. According to one embodiment, processors 111, 121, 131 are one or more microprocessors.

The memories 113, 123, 133 may comprise Random access Memory (RAM), persistent memory, such as a hard drive, a CD-ROM, a DVD drive, a USB memory device, or the like, or a combination thereof.

In the replicating server 110, a publication application 114 is encoded on the memory 113. According to one embodiment of the present invention, each server 110, 120, 130 has a publication application 114, respectively encoded on its respective memory 113, 123, 133, and any server may be the replicating server. According to one embodiment, one server 110 will serve as the replicating server and another server 120 will serve as a fail over replicating server. That is, the other server 120 will replicate with the client computer 140, 150 if the first server 110 fails. According to one embodiment, the server serving as the replicating server and the server serving as the fail over server will flip responsibilities at a scheduled time.

Replicas 115, 125, 135 of a database are encoded on the memory 113, 123, 133 of each server 110, 120, 130 in the replication service. Replicas 145, 155 of the database are also encoded on at least one client computer 140, 150. The servers 110, 120, 130 in the replication service replicate with each other at frequencies subject to conditions and rules of the service. Replicas in the customer computers 140, 150 replicate with a server 110, 120, 130 in the service upon an indication to replicate, which occurs at a frequency subject to conditions and rules of the service and the customer computer.

A replication application 148 is encoded on the memory 143, 153 of the client computer 140, 150 and executed by the corresponding processor 141, 151. While illustrated and described as being in the client computer 140, 150, the replication application, may alternatively be encoded on a memory 113, 123, 133 in one or more server computers 110, 120, 130, or the replication may be partially in the client computer 140, 150 and partially in one or more of the server computers, and be executed by the corresponding processor or processors.

When a customer computer 140, 150 replicates with a server 110, 120, 130 of the replication service, the replication application 148 updates a replication history 146, 156, which may be encoded on a memory 143, 153 of the client computer 140, 150, as illustrated, or on a memory 113, 123, 133 of a server computer 110, 120, 130. The replication history 146, 156 stores the identity of the server replicated with and a time stamp from the time that the replication is completed. The replication history may be a table, a file, or any other suitable data structure.

According to one embodiment, the replication application 148 also imputes a time stamp for each healthy server in the replication service that is not replicated with. The imputed time stamp comprises the identity of the healthy server and the time of completion of the replication modified by the quality of service metric. The replication application enters this imputed time stamp in the replication history 146, 156 with the identity of the healthy server that it was imputed for.

According to one embodiment, the replication application 148 includes program instructions that calculates and stores the quality of service metric. The quality of service metric is a period of time, during which, each server in the replication service is virtually assured to have replicated with the other servers in the replication service. The quality of service metric may be calculated based on system parameters, historical replication data, or any other means appropriate for determining a period of time for assured replication.

When a new server 110, 120, 130 is replicated with, due to fail over or site flip, for example, even when the client/local computer 140, 150 has not replicated with the new server for a long period of time or ever, the replication need only update for changes since the imputed replication time.

Figure 2:
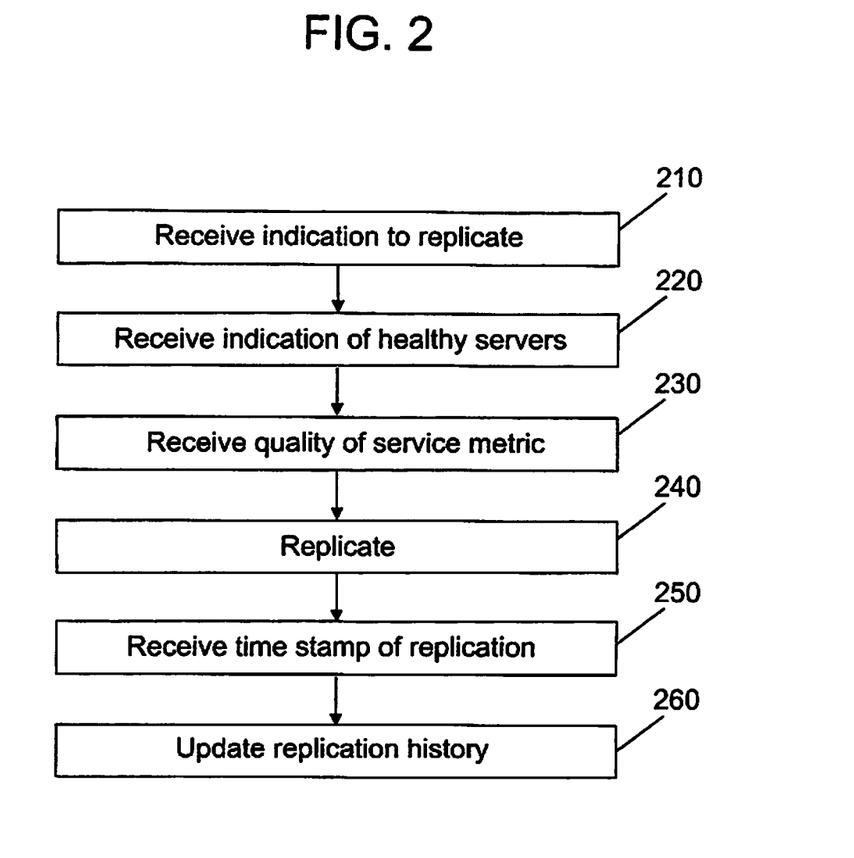
FIG. 2 is a flow diagram of a process for minimizing replication when a different server is replicated with, according to an embodiment of the present invention.

FIG. 2 is a flow diagram of a process at a client computer for minimizing replication when a different server is replicated with, according to an embodiment of the present invention. The replication application 148 receives an indication to replicate (Step 210). The indication to replicate may comprise a change to a replica 115, 125, 135, 145, 155 of the database, passing of a period of time for automatic replication, a user action, or any other indication that is appropriate for triggering replication.

The replication application 148 receives an indication of the identities of healthy servers in the replication service (Step 220) and the quality of service metric (Step 230). According to one embodiment, the indication of the identities of healthy servers and the quality of service metric are published by the publication application 114 in one or more servers 110, 120, 130. Alternatively, the identities of healthy servers and the quality of service metric may be retrieved by the replication application from a table or file stored in one or more servers in the replication service.

The replication application 148 replicates the replica of the database on one of the servers 110, 120, 130 with the replica of the database stored on the client computer 140, 150. That is, changes to each replica since the last replication between the subject server and client computer are transmitted and implemented in the corresponding replica.

Figure 3:
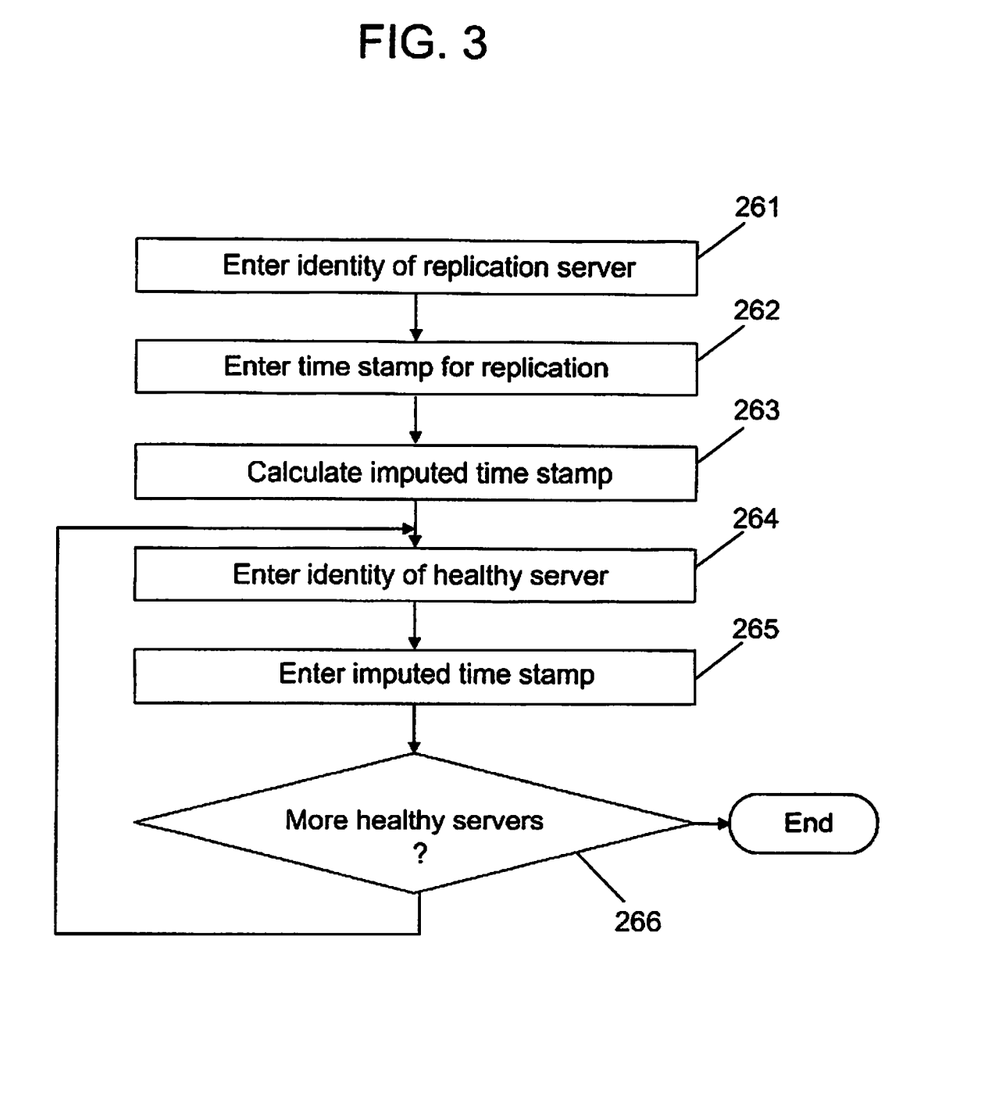
FIG. 3 is a more detailed flow diagram the step of updating replication history from the process of FIG. 2, according to an embodiment of the present invention.

After successful replication, the replication application 148 receives a time stamp of replication (Step 250) and updates the replication history 146, 156 (Step 260). As shown in FIG. 3, the step of updating the replication history comprises storing the identity of the replication server and the time stamp of replication, as well as calculating imputed time stamps for each healthy server and recording the identities of each healthy server in the replication service with the imputed time stamp.

The replication application 148 records on the replication history 146, 156 the identity of the replication server (Step 261) and the replication time stamp (Step 262) as a replication data pair. The replication application calculates the imputed time stamp for healthy servers in the replication service (Step 263). According to one embodiment, the imputed time stamp is calculated by subtracting the quality of service metric from the replication time stamp.

After the imputed time stamp is recorded, the replication application 148 records on the replication history 146, 156, the identity of the healthy server (Step 264) and the imputed time stamp (Step 265) as a data pair for each healthy server identified in step 220. Following the recording of the identity of each server (step 264) with the imputed time stamp (Step 265), the replication application 148, determines whether or not there are any more healthy servers in the replication service (Step 266). If there are more healthy servers (Y at step 266), then the replication application repeats steps 264 and 265 for the next healthy server. After the replication application 148 has recorded the identity with the imputed time stamp for each healthy server (N at step 266), the replication application ends.

Figure 4:
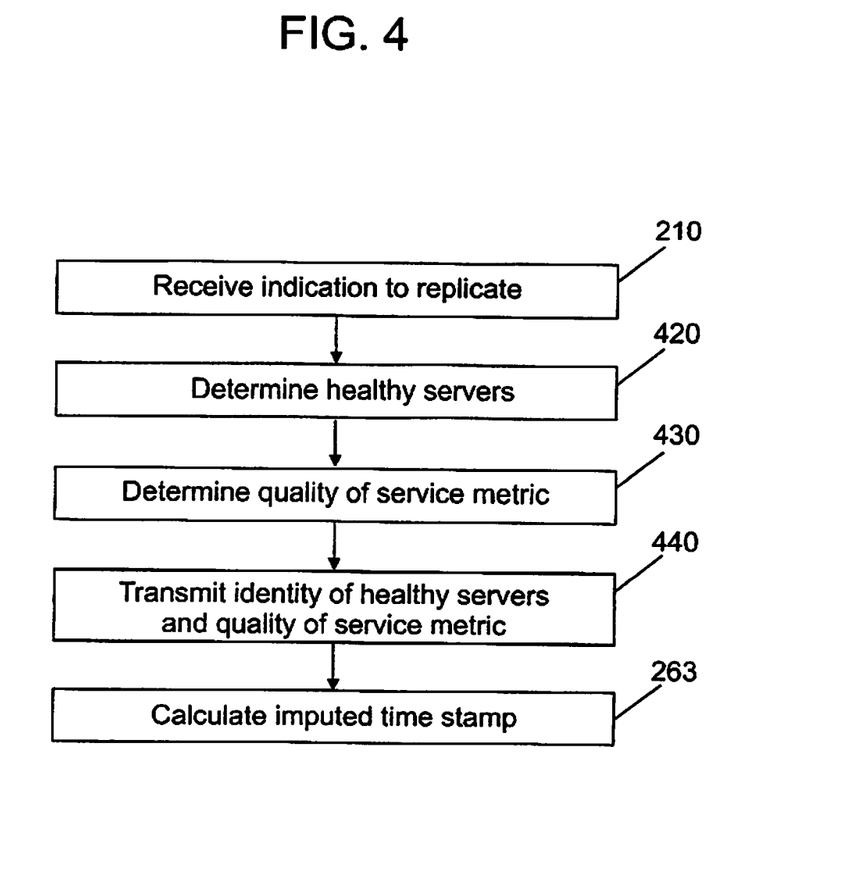
FIG. 4 is a flow diagram of a process at a server for publishing identities of healthy servers and a quality of service metric, according to an embodiment of the present invention.

FIG. 4 is a flow diagram of a process at a server for publishing identities of healthy servers and a quality of service metric, according to an embodiment of the present invention. The publication application 114 at the replicating server 110, 120, 130, receives the indication to replicate (Step 410). The publication application 114 may be a part of the replication application 148, a stand alone application callable by the replication application 148, or a stand alone application which retrieves or receives the indication to replicate from the replication application 148 or in addition to the replication application.

The publication application 114 determines the identity of each healthy server in the replication service at the time of replication (Step 420). According to one embodiment, the publication application will only determine that a server is healthy if it has been on-line continuously for at least the length of time of the quality of service metric. Alternatively, the determination of healthy servers (step 420), may be triggered by an indication of successful replication or entry of replication data (replicating server identity and replication time stamp) into the replication history, or any other step of the replication process.

The publication application 114 determines the quality of service metric for the replication service (Step 430). The quality of service metric may be calculated using historical replication data, system performance parameters and settings, other performance indicators, or combinations thereof. Also the quality of service metric may be calculated using statistical probability, empirical data, or combinations thereof.

The publication application 114 transmits or publishes the identities of healthy servers and the quality of service metric, which are then used to calculate the imputed time stamp for a replication for servers in the replication service that are not replicated with.

Following is a timeline example of replications with different servers with and without the method for minimizing replication according to the present invention: (The replication service comprises servers A, B, and C, and the client computer has a local replica.)

Without the method of the present invention

12:01 PM Jan. 10, 2010 Local replica replicates with Server A.

12:01 PM Jan. 10, 2010 When replication is complete, replication history is updated to indicate replication with Server A at 12:01 PM Jan. 10, 2010.

3:20 PM Mar. 11, 2010 A new Server (Server B) is added to the Service

3:30 PM Mar. 11, 2010 Local replica replicates with server A.

5:10 PM Mar. 11, 2010 Server A is taken down for maintenance and the local replica must replicate with server B. Since there is no replication history for replication with server B, the local replica may need to perform a full (from time 0) replication.

2:36 PM Jul. 22, 2010 Local replica replicates with server A.

4:36 PM Jul. 22, 2010 The service performs a site flip, where the disaster recovery server (server C) becomes the primary server and the primary server (Server A) becomes the disaster recovery server. Since replication history with server C may be months ago a long replication may be needed.

For the method of the invention:

12:01 PM Jan. 10, 2010 Local replica replicates with Server A.

12:01 PM Jan. 10, 2010 When replication is complete, replication history is updated to indicate replication with Server A at 12:01 PM Jan. 10, 2010.

3:20 PM Mar. 11, 2010 A new Server (Server B) is added to the Service

3:30 PM Mar. 11, 2010 Local replica replicates with server A. Server B is listed as healthy and the quality of service metric is 4 hours. Imputed time stamp is 11:30 AM Mar. 11, 2010. Replication history for server B is recorded as 11:30 AM Mar. 11, 2010.

5:10 PM Mar. 11, 2010 Server A is taken down for maintenance and the local replica must replicate with server B. Since there is an imputed service history for server B, the replication only needs to go back to 11:30 AM Mar. 11, 2010.

2:36 PM Jul. 22, 2010 Local replica replicates with server A. Server C is listed as healthy and the quality of service metric is 5 hours. Imputed service history at 9:36 AM Jul. 22, 2010 is recorded for server C.

4:36 PM Jul. 22, 2010 The service performs a site flip, where the disaster recovery server (server C) becomes the primary server and the primary server (Server A) becomes the disaster recovery server. Since there is an imputed replication history with server C, the replication history 2010 only needs to go back to 9:36 AM Jul. 22, 2010.

The invention can take the form of an entirely hardware embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable medium having a machine-executable program of instructions, which when executed by a machine, such as a computer, performs the steps of the method. This program product may be stored on any of a variety of known machine-readable medium, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention.

The scope of the invention is intended to encompass equivalent variations and configurations to the full extent of the following claims.

What is claimed is:

1. A computer program product comprising:
   a computer readable storage medium; and
   computer usable code stored on the computer readable storage medium, where, if executed by a processor, the computer usable code causes a computer to:
   receive an identity and a quality of service metric for each healthy server in a replication service, wherein the quality of service metric is to include a period of time within which replication is assured to be completed;
   update a replication history with the identity and with a time stamp when a replication of a database is to be performed, wherein the time stamp is to include a time of completion of the replication; and
   calculate an imputed time stamp for each healthy server in the replication service that is not replicated with to update the replication history, wherein the imputed time stamp is to include the time stamp modified by the quality of service metric.

2. The computer program product of claim 1, wherein the computer usable code, if executed, further causes a computer to receive an indication to perform the replication.

3. The computer program product of claim 2, wherein the indication is to include one or more of a change to a replica of the database, a passing of a period of time, and a user action.

4. The computer program product of claim 1, wherein the replication history is to include one or more of a table and a file.

5. The computer program product of claim 1, wherein the computer usable code, if executed, further causes a computer to calculate the imputed time stamp by subtracting the period of time within which replication is assured to be completed from the time of completion of the replication.

6. The computer program product of claim 1, wherein the computer usable code, if executed, further causes a computer to perform a replication for a period of time beginning with the imputed time stamp.

7. A method comprising:
   receiving an identity and a quality of service metric for each healthy server in a replication service, wherein the quality of service metric includes a period of time within which replication is assured to be completed;
   updating a replication history with the identity and with a time stamp when a replication of a database is performed, wherein the time stamp includes a time of completion of the replication; and
   calculating an imputed time stamp for each healthy server in the replication service that is not replicated with to update the replication history, wherein the imputed time stamp includes the time stamp modified by the quality of service metric.

8. The method of claim 7, further including receiving an indication to perform the replication.

9. The method of claim 8, wherein the indication includes one or more of a change to a replica of the database, a passing of a period of time, and a user action.

10. The method of claim 7, wherein the replication history includes one or more of a table and a file.

11. The method of claim 7, further including calculating the imputed time stamp by subtracting the period of time within which replication is assured to be completed from the time of completion of the replication.

12. The method of claim 7, further including performing a replication for a period of time beginning with the imputed time stamp.

13. An apparatus comprising a processor to:
   receive an identity and a quality of service metric for each healthy server in a replication service, wherein the quality of service metric is to include a period of time within which replication is assured to be completed;
   update a replication history with the identity and with a time stamp when a replication of a database is to be performed, wherein the time stamp is to include a time of completion of the replication; and
   calculate an imputed time stamp for each healthy server in the replication service that is not replicated with to update the replication history, wherein the imputed time stamp is to include the time stamp modified by the quality of service metric.

14. The apparatus of claim 13, wherein the processor is to receive an indication to perform the replication.

15. The apparatus of claim 14, wherein the indication is to include one or more of a change to a replica of the database, a passing of a period of time, and a user action.

16. The apparatus of claim 13, wherein the replication history is to include one or more of a table and a file.

17. The apparatus of claim 13, wherein the processor is to calculate the imputed time stamp by subtracting the period of time within which replication is assured to be completed from the time of completion of the replication.

18. The apparatus of claim 13, wherein the processor is to perform a replication for a period of time beginning with the imputed time stamp.

* * * * *